United States Patent
Yamagishi et al.

[15] 3,666,807

[45] May 30, 1972

[54] PROCESS FOR PRODUCING UREA

[72] Inventors: Akio Yamagishi; Genya Matumoto, both of Niihama-shi, Japan

[73] Assignee: Sumitomo Chemical Company, Ltd., Higashi-ku, Osaka, Japan

[22] Filed: Feb. 7, 1969

[21] Appl. No.: 797,623

[30] Foreign Application Priority Data

Feb. 12, 1968 Japan....................................43/9017

[52] U.S. Cl. ..........................................260/555 A, 23/199
[51] Int. Cl.......................................................C07c 127/00
[58] Field of Search .....................................260/555, 555 A

[56] References Cited

UNITED STATES PATENTS 1,670,341  5/1928  Casale ...................................260/555

3,371,115  2/1968  Cook et al. ...........................260/555

FOREIGN PATENTS OR APPLICATIONS 6,704,780  10/1967  Netherlands..........................260/555
1,124,868  8/1968  Great Britain........................260/555

*Primary Examiner*—Bernard Helfin
*Assistant Examiner*—Michael W. Glynn
*Attorney*—Stevens, Davis, Miller & Mosher

[57] ABSTRACT

The present invention discloses a process for the synthesis of urea wherein, in a process for the synthesis of urea in combination with a process for the synthesis of ammonia, the necessity of cooling the circulating gas of the process for the synthesis of ammonia for separating ammonia for use in the synthesis of urea is eliminated, thereby not only avoiding the heat loss due to the cooling but also rendering unnecessary the facilities for the cooling. Thus, the process is made simple and economical.

2 Claims, 1 Drawing Figure

Patented May 30, 1972
3,666,807
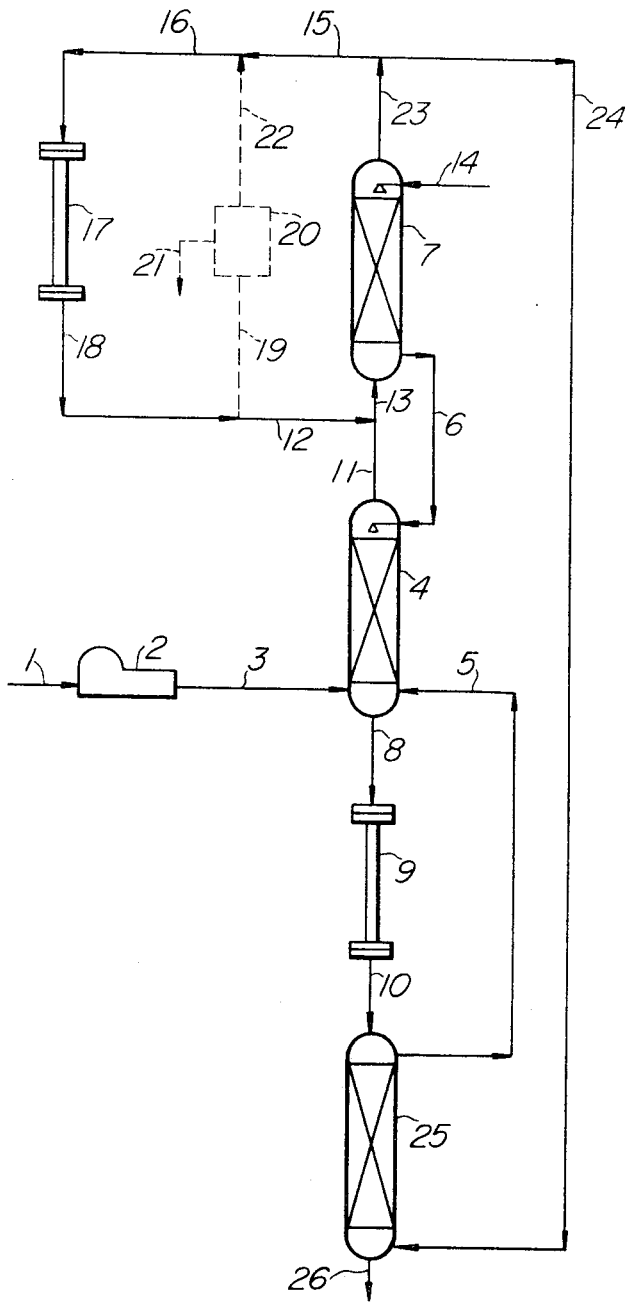
INVENTORS
AKIO YAMAGISHI
GENYA MATUMOTO
BY Stevens, Davis, Miller & Mosher
ATTORNEYS

PROCESS FOR PRODUCING UREA

The present invention relates to a process for the preparation of urea and more particularly to a process for the preparation of urea in combination with a process for the synthesis of ammonia.

With regard to a process for the preparation of urea in combination with a process for the synthesis of ammonia, there have been known processes which comprise treating a crude ammonia synthesis gas containing carbon dioxide with an absorbing liquid containing ammonia under a pressure required for the synthesis of urea to effect the absorption of substantially all of the carbon dioxide, maintaining the resulting absorbing liquid at a temperature and a pressure both required for the synthesis of urea to effect the synthesis of urea and simultaneously carrying out the synthesis of ammonia from the separated ammonia synthesis gas which does not contain carbon dioxide, the synthesized ammonia being employed for the synthesis of urea (Bulletin of Japanese Patent Application Publications No. 3291/67 and No. 12245/67).

According to these previously proposed processes, the removal of carbon dioxide contained in the crude ammonia synthesis gas and the synthesis of urea can be simultaneously effected and, therefore, the simplification of the process as well as the improvement in efficiency can be realized. In these process also, however, the procedure for the synthesis of ammonia from the separated ammonia synthesis gas containing no carbon dioxide is carried out in accordance with the heretofore publicly known process. In a general process for the synthesis of ammonia, the outlet effluent gas from a reactor for the synthesis of ammonia is cooled by means of water, an ammonia cooler or the like to effect the liquefaction of ammonia, followed by the separation of the liquefied ammonia and the unreacted ammonia synthesis gas is recycled to the reactor. However, this process is accompanied by much loss of heat which is caused by the cooling of the outlet effluent gas for the ammonia synthesizing reactor and accompanied by a considerable increase in cost for cooling.

On the other hand, such attempt has been made that ammonia is absorbed in water. Although this method is satisfactory for the purpose of the preparation of an aqueous ammonia solution, it is unsuitable for the preparation of ammonia in the isolated form.

As a result of the intensive study made by the inventors in view of the fact that, in case of the synthesis of urea from a crude ammonia synthesis gas containing carbon dioxide in combination of the synthesis of urea with the process for the synthesis of ammonia, it is not absolutely necessary to obtain ammonia in the isolated liquid or gaseous form, there has successfully been established a combination process wherein the ammonia is taken into the process for the synthesis of urea directly from the circulating gas of the process for the synthesis of ammonia.

One object of the present invention is to provide a process for the synthesis of urea wherein, in a process for the synthesis of urea in combination with a process for the synthesis of ammonia, the necessity of cooling the circulating gas of the process for the synthesis of ammonia for separating ammonia for use in the synthesis of urea is eliminated, thereby not only avoiding the heat loss due to the cooling but also rendering unnecessary the facilities for the cooling.

Another object of the present invention is to provide a process for the synthesis of ammonia wherein the process is combined with a process for the synthesis of ammonia, thereby simplifying the process for the synthesis of urea as well as making an improvement in efficiency of the process.

The present process provides, in a method for producing urea by combining an urea synthesis process with an ammonia synthesis process wherein urea is produced by reaction of ammonia with carbon dioxide under a pressure of 120–400 kg/cm² and at a temperature of 160°–230° C. and ammonia is produced by reaction of hydrogen and nitrogen under a pressure of 100–500 kg/cm² and at a temperature of 200°–600° C., an improvement which comprises the following steps:

1. introducing an ammonia-containing circulating gas of a process for the synthesis of ammonia or said circulating gas together with a gaseous component separated from a carbon dioxide absorption zone in the step (3), into an ammonia absorption zone, 2. contacting the said gaseous component in the step (1) with an absorbing liquid containing water and/or ammonia to obtain an ammonia containing absorbing liquid and an ammonia synthesis gas which consists substantially of hydrogen and nitrogen, 3. introducing a crude ammonia synthesis gas which contains carbon dioxide or the said crude ammonia synthesis gas together with ammonia and carbon dioxide which are recovered from a process for the purification of reactor solution of urea in the step (6), into a carbon dioxide absorption zone, 4. contacting the said gaseous component in the step (3) with the ammonia containing absorbing liquid in the step (2) to obtain an ammonia-ammonium carbamate solution and an ammonia synthesis gas which does substantially not contain carbon dioxide, 5. introducing the ammonia-ammonium carbamate solution in the step (4) into a reactor for the synthesis of urea to effect the synthesis of urea, 6. introducing the reactor solution of urea which consists of urea, water, unreacted ammonia and unreacted carbon dioxide obtained from the reactor in the step (5), into the process for the purification of urea to obtain the aqueous urea solution, 7. introducing the ammonia and carbon dioxide which are recovered from the process in the step (6) into the reactor in the step (5), the ammonia absorption zone in the step (1) or the carbon dioxide absorption zone in the step (3), 8. subsequently introducing the gaseous component separated from the carbon dioxide absorption zone in the step (3) into the ammonia absorption zone in the step (1) or directly into the reaction process for the synthesis of ammonia, and 9. introducing a gaseous component separated from the ammonia absorption zone in the step (2) into the reaction process for the synthesis of ammonia.

The purification of reactor solution of urea in the step (6) may be conducted by effecting the stripping of said reactor solution with a part of a gaseous component obtained in the step (2), a gaseous component from the process of said purification which contains unreacted ammonia, unreacted carbon dioxide and ammonia synthesis gas is introduced into the carbon dioxide absorption zone in the step (3) and the remaining portion thereof obtained in the step (2) is passed into the reaction process for the synthesis of ammonia in the step (9). Said stripping may be operated at from the same pressure as of the reactor for the synthesis of urea to 50 kg/cm² lower than that. Further, the ammonia absorption zone in the step (1) and the carbon dioxide absorption zone in the step (3) can be operated under from the same pressure as of the reactor for the synthesis of urea to 50 kg/cm² lower than that.

In the process according to the present invention, the ammonia-containing circulating gas of the reaction process for the synthesis of ammonia is an outlet effluent gas from the reactor for the synthesis of ammonia. Conventionally, this outlet effluent gas has been subjected to the cooling to separate ammonia through the liquefaction thereof. According to the present invention, however, the ammonia is introduced in the form of gas into the ammonia absorption zone and thereby the ammonia for the synthesis of urea is transferred into the absorbing liquid.

For this reason, according to the present invention, not only is eliminated the necessity of the cooling by means of the ammonia cooler, etc., leading to no need of facilities for the cooling, but also the heat loss due to the cooling can be considerably reduced. In addition it is to be noted that, in case of the separation of ammonia through the liquefaction by the cooling, the complete collection of the ammonia is impossible due to the limitation of the partial pressure of the ammonia, while by the use of the absorbing liquid, according to the present invention, the substantially complete collection of the ammonia in the circulating gas is not only possible by selecting a condition, but also the rate of conversion in the synthesis of ammonia can be improved.

The circulating gas is an ammonia-containing ammonia synthesis gas containing, besides ammonia, hydrogen, nitrogen and a little amount of inert gas. The gaseous component which is separated from the carbon dioxide absorption zone and introduced into the ammonia absorption zone or the reaction process for the synthesis of ammonia is an ammonia synthesis gas consisting of hydrogen, nitrogen and substantially not containing carbon dioxide, however, a small amount, e.g. several per cent or less of an ammonia may be contained therein. Accordingly, the gaseous component separated from the ammonia absorption zone is an ammonia synthesis gas consisting mainly of hydrogen and nitrogen, and contains approximately no ammonia and substantially completely no carbon dioxide. The gas to be introduced into the reaction process for the synthesis of ammonia is, after separating ammonia if desired, passed into the reactor for the synthesis of ammonia, where some of hydrogen and nitrogen are converted to ammonia, whereupon the gas is, as a circulating gas containing ammonia, again passed into the ammonia absorption zone.

The ammonia absorption zone is an absorption zone constituted of a suitable one selected from a packed tower, wetted wall tower, bubble cap tower and the like which are in general used for distillation, stripping, absorption or the like. This absorption zone has a main object to absorb the ammonia contained in the gas. As an absorbing liquid introduced into the absorption zone may be employed water, an aqueous urea solution, an aqueous ammonium carbamate solution, an aqueous ammonia solution, a reactor solution of the synthesis of urea or liquified ammonia. The absorbing liquid absorbs a major portion or all of ammonia contained in the introduced gaseous component.

The carbon dioxide absorption zone is an absorption zone constituted, likewise as the ammonia absorption zone, of a suitable one selected from a packed tower, wetted wall tower, bubble cap tower and the like. This absorption zone has a main object to absorb the carbon dioxide contained in the gas and, at the same time, absorb ammonia. In addition, there may be provided with a heat exchanger as required.

The heat exchanger serves for the removal of the ammonia absorption heat and/or the ammonium carbamate formation heat which are generated in the carbon dioxide absorption zone. Especially since it is possible to operate this absorption zone at a high temperature of 130 to 180 C., the generated heat can be recovered in the form of steam by means of a boiler. The absorbing liquid supplied into the carbon dioxide absorption zone is an absorbing liquid containing the ammonia withdrawn from the ammonia absorption zone. The introduced crude ammonia synthesis gas containing carbon dioxide is an outlet effluent gas of the CO-shift converter which gas is produced from a hydrocarbon or the like by a known method, and contains as main ingredients hydrogen, nitrogen and carbon dioxide. The ratio of hydrogen to nitrogen in this gas is adjusted to be approximately 3/1 as is in known arts. The amount of carbon dioxide is preferable to be, in the synthesis of urea, stoichiometrically less than equivalent to that of ammonia synthesized from hydrogen and nitrogen. When carbon dioxide is present in an excessive amount, the excessive portion thereof must preliminarily be removed by a known method. If, because of the presence of excessive amounts of hydrogen and nitrogen, ammonia is present in too much amount per amount of carbon dioxide in view of stoichiometry in the synthesis of urea, the excessive amount of ammonia may be separated in the reaction process for the synthesis of ammonia.

The reactor solution of the synthesis of urea consists of urea, water, ammonia and carbon dioxide, and the carbon dioxide is substantially present therein as ammonium carbamate. In general, excess ammonia is present in the product solution together with urea, water, ammonium carbamate, because ammonia is fed into the urea synthesis process in a larger amount than equivalent amount of carbon dioxide. In the method of the present invention, it is possible to recover and reuse the unreacted materials, that is, ammonia and carbon dioxide or ammonia and ammonium carbamate.

The ammonia and carbon dioxide which are recovered from the process for the synthesis and purification of urea and introduced into the ammonia absorption zone, carbon dioxide absorption zone or the reactor for the synthesis of urea are the ammonia and carbon dioxide which remain unreacted in the reactor solution of the synthesis of urea, and are obtained in the form of gas, liquid or solid from the process for the synthesis of urea through a known purification process. However, it is noted that when the ammonia and carbon dioxide are introduced in the form of liquid or solid, they are introduced in the form of ammonia-ammonium carbamate. When the unreacted materials are introduced into the ammonia absorption zone, it is preferred that the recovered unreacted materials containing as a main component ammonia are introduced.

Generally, with regard to a process for the purification, there is employed either a process which comprises subjecting the reactor solution of the synthesis of urea to reducing pressure in a manner of two-stage or three-stage to separate the ammonia and carbon dioxide as vapor phase, effecting the absorption of said vapor phase in an absorbing liquid and recycling the resulting liquid under pressure by means of a pump, or a process which comprises effecting the stripping of the reactor solution of the synthesis of urea with a carbon dioxide, ammonia or the like. In this case, the ammonia and carbon dioxide are accompanied by urea, water, the absorbing liquid or the like depending on the process for the purification.

When the purification is conducted by effecting the stripping of the reactor solution of the synthesis of urea with the ammonia synthesis gas, the gaseous components stripped from the process for the synthesis of urea are accompanied by ammonia synthesis gas such as hydrogen and nitrogen, and they can be introduced as such into the carbon dioxide absorption zone. Since, according to this process, the purification procedure of the reactor solution of the synthesis of urea is exceedingly simplified, the above-mentioned process is useful for combining thereof with the process according to the present invention.

The gas separated from the carbon dioxide absorption zone is introduced, as mentioned hereinbefore, into the ammonia absorption zone or into the reaction process for the synthesis of ammonia.

The synthesis of urea is carried out in the reactor maintained at a temperature of 160° to 230° C. and a pressure of 120 to 400 kg/cm² by a known process.

The reaction process for the synthesis of ammonia is composed of a reactor for the synthesis of ammonia which is operated under a pressure of 100 – 500 kg/cm², and at a temperature of 200° – 600° C. in accordance with a known process.

In the procedure for the synthesis of urea, according to the present invention, it is desirable that the ammonia absorption zone and the carbon dioxide absorption zone are operated under from the same pressure as of the reactor for the synthesis of urea to 50 kg/cm² lower than that. Furthermore it is advantageous that the reaction process for the synthesis of ammonia is operated under the approximately same pressure as that of the synthesis of urea. By conducting the operation in such manner as described above, it becomes possible to considerably reduce the motive power required for the flowing of the fluid through said various means. Especially when the stripping with the ammonia synthesis gas is applied to the process for the purification of the reactor solution for the synthesis of urea, the process for the purification is caused to have the same pressure as that required for the synthesis of urea, leading to the reduction of the cost of the motive power thereby to improve the heat economy. Moreover, the operation under the same pressure enables the decrease in the troubles of a pump such as a carbamate pump and a compressor.

In addition, according to the present invention, it is not necessarily required that the ammonia absorption zone and the carbon dioxide absorption zone are provided separately. There may be employed a single absorption apparatus constructed by integrating them. In this case, it should be understood that the portion effecting mainly the absorption of ammonia and the portion effecting mainly the absorption of carbon dioxide are the ammonia absorption zone and the carbon dioxide absorption zone, respectively. In a gas-liquid counter-current type absorption tower which is usually employed, the lower section of the tower and the upper section of the tower are the carbon dioxide absorption zone and the ammonia absorption zone, respectively.

A preferred embodiment of the present invention will now be described with reference to the drawing. In this embodiment the stripping utilizing the ammonia synthesis gas is employed in the system for the purification of the reactor solution of the synthesis of urea. However, other known processes for the purification can also be employed.

The crude ammonia synthesis gas containing carbon dioxide and withdrawn from the outlet of the CO-shift converter is supplied through a line 1 and, after compressed to a pressure required for the synthesis of urea, i.e., 120 to 400 kg/cm$^2$ by means of a compressor 2, is passed through a line 3 into the carbon dioxide absorption zone 4. Through a line 5 is supplied the outlet effluent gas of the stripping tower which gas comes from the process for the synthesis and purification of urea and is composed mainly of hydrogen, nitrogen, ammonia, carbon dioxide and water. On the other hand, through a line 6 is introduced the ammonia-containing absorbing liquid coming from the ammonia absorption zone 7. In the carbon dioxide absorption zone, substantially all portion of the carbon dioxide supplied from the line 3 and the line 5 and some or all of the ammonia and water which are supplied from the line 5 are transferred into the absorbing liquid. After the absorption treatment, the absorbing liquid is passed through a line 8 into a reactor 9 for the synthesis of urea which reactor is maintained at approximately the same pressure as that of the absorption zone. The reactor 9 is kept at a temperature required for the synthesis of urea, i.e., 160° to 230° C. thereby to effect the synthesis of urea. The reactor solution of the synthesis of urea is supplied through a line 10 into a stripping tower 25. The temperature of the carbon dioxide absorption zone is usually maintained at 130° to 180° C., and the heat generated in the absorption zone is removed by means of a boiler (not shown) and recovered as steam.

The gaseous component separated from the carbon dioxide absorption zone is an ammonia synthesis gas which contains or does not contain ammonia. Into an ammonia absorption zone 7 is through a line 13 introduced said gaseous component together with the ammonia-containing ammonia synthesis gas (circulating gas) which comes from a line 12. Into the ammonia absorption zone which is maintained at approximately the same pressure as that of the carbon dioxide absorption zone is through a line 14 introduced the absorbing liquid, which absorbs a major portion or all of the ammonia contained in the gas from the line 13. The temperature of the absorption zone varies depending on the kind of the absorbing liquid, but is generally in the range of 20° to 100° C. The absorbing liquid after the absorption treatment is withdrawn through the line 6 and passed into the carbon dioxide absorption zone. The separated ammonia synthesis gas which contains but little ammonia and contains substantially no carbon dioxide is through a line 23 withdrawn, and some thereof is through a line 15 passed into the reaction process for the synthesis of ammonia while the remaining portion thereof is through a line 24 introduced into the stripping tower. When the pressure in the process for the synthesis of ammonia is different from the pressure for the synthesis of urea, the pressure of the gas of the line 15 is elevated or reduced as required. Whereupon, after removing the ammonia if necessary, the gas is introduced a line 16 into a reactor 17 for the synthesis of ammonia. In the reactor 17 is produced ammonia from hydrogen and nitrogen. The resulting gas is through a line 18, after elevating or reducing the pressure as required, recycled into the ammonia absorption zone, usually through a line 12 and line 13. If, because the amount of the ammonia synthesized from the hydrogen and nitrogen in the line 1 is too much as compared with the amount of the carbon dioxide in the same line in view of stoichiometry with respect to the synthesis of urea, it is required to withdraw the excessive amount of ammonia out of the system, the gas of an amount corresponding to the excessive ammonia is through a line 19 withdrawn, and the ammonia which is separated from the gas by means of an ammonia separator 20 is withdrawn through a line 21, while the ammonia synthesis gas not containing an ammonia is through a line 22 withdrawn and is returned to the line 15. On the other hand, the reactor solution of the synthesis of urea which is through the line 10 withdrawn and supplied into the stripping tower 25 is stripped, under approximately the same pressure as that of the synthesis of urea, with the ammonia synthesizing feed gas introduced through a line 24. Whereby, a major portion or all of the ammonia and carbon dioxide which remain unreacted in the reactor solution of the synthesis of urea and a small amount of water are transferred into the vapor phase, and they are via the line 5 supplied into the carbon dioxide absorption zone, while the aqueous urea solution which does not almost contain ammonia and carbon dioxide is obtained through a line 26.

It will be understood the foregoing description made with reference to the flow sheet of the embodiment according to the present invention has been presented principally for purposes of illustration rather than limitation and that numerous variations and modifications of the described invention are possible without departing from the spirit thereof or the scope of the appended claims.

The invention will now be illustrated in more detail by means of the following example.

EXAMPLE

A gas consisting of 60.0 percent by volume of hydrogen, 20.0 percent by volume of nitrogen, 20.0 percent by volume of carbon dioxide was through the line 1 introduced at a rate of 1,735 mol. per hour and, after elevating the pressure to 220 kg/cm$^2$ by means of the compressor 2, was through the line 3 passed into the carbon dioxide absorption zone 4 (packed tower). At the same time, in said absorption zone was through the line 5 introduced at a rate of 3,405 mol. per hour the stripping tower outlet effluent gas consisting of 31.1 percent by volume of hydrogen, 10.4 percent by volume of nitrogen, 50.2 percent by volume of ammonia, 6.6 percent by volume of carbon dioxide and 1.7 percent by volume of water, and the ammonia, carbon dioxide and water were absorbed, at a tower bottom temperature of 140° C., in the absorbing liquid coming through the line 6 from the ammonia absorption zone 7. The liquid after the absorption treatment had a rate of 75.2 kg per hour and a composition of 54.4 percent by weight of ammonia, 33.4 percent by weight of carbon dioxide, 4.8 percent by weight of urea and 7.4 percent by weight of water. Said liquid was through the line 8 withdrawn and supplied into the reactor 9 for the synthesis of urea. The reactor 9 was maintained at a temperature of 180° C. and a pressure of 200 kg/cm$^2$ to effect the synthesis of urea. The reactor solution of the synthesis of urea of a composition of 38.7 percent by weight of ammonia, 13.1 percent by weight of carbon dioxide, 32.5 percent by weight of urea and 15.7 percent by weight of water was withdrawn and supplied through the line 10 into the stripping tower 25. Into the stripping tower was through the line 24 supplied at a rate of 1,413 mol. per hour the ammonia absorption zone outlet effluent gas consisting of 75.0 percent by volume of hydrogen and 25.0 percent by volume of nitrogen, and the stripping of the ammonia and carbon dioxide contained in the reactor solution of the synthesis of urea was effected under the conditions of a pressure of 190 kg/cm², a tower top temperature of 180° C. and a tower bottom temperature of 120° C. As a result, through the line 26 from the tower bottom were obtained 35.2 kg. of the aqueous urea solution composed of 69.4 percent by weight of urea and 30.6 percent by weight of water. The carbon dioxide absorption zone outlet effluent gas was via the line 11, together with the ammonia-synthesizing circulating gas from the line 12, introduced through the line 13 into the ammonia absorption zone 7 (packed tower). Into the absorption zone 7 was, as a absorbing liquid, introduced through the line 14 at a rate of 8.1 kg per hour the aqueous urea solution composed of 44.4 percent by weight of urea and 55.6 percent by weight of water thereby to effect the absorption of ammonia under the conditions of a tower top temperature of 30° C. and a pressure of 220 kg/cm². The liquid after the absorption treatment was through the line 6 passed into the carbon dioxide absorption zone 4. The separated ammonia synthesis gas consisting of 75.0 percent by volume of hydrogen and 25.0 percent by volume of nitrogen was through the line 23 withdrawn, and some portion thereof was recycled to the stripping tower while the remaining portion thereof was through the line 15 at a rate of 5,326 mol. per hour introduced into the reaction system for the synthesis of ammonia. This gas was through the line 16 introduced into the reactor 17 for the synthesis of ammonia, in which reactor 17 the reaction for the synthesis of ammonia was effected under a pressure of 220 kg/cm². Then, the circulating gas of the reaction system for the synthesis of ammonia which gas was composed of 63.8 percent by volume of hydrogen, 21.2 percent by volume of nitrogen and 15.0 percent by volume of ammonia was withdrawn through the line 18 at a rate of 4,634 mol. per hour and introduced through the line 12 and line 13 into the ammonia absorption zone 7.

What is claimed is:

1. A process for the synthesis of urea by reaction of ammonia with carbon dioxide under a pressure of 120–400 kg/cm² and at a temperature of from 160° to 230° C. which comprises:
    a. introducing into an ammonia absorption zone and contacting therein
        1. a circulating gas consisting essentially of ammonia, hydrogen and nitrogen which is the reaction effluent from an ammonia synthesis zone and
        2. a gaseous component containing hydrogen, nitrogen and a small amount of ammonia separated from the carbon dioxide absorption zone of step (b) (4) with
        3. an absorbing liquid selected from the group consisting of water, an aqueous urea solution, an aqueous ammonium carbamate solution, an aqueous ammonia solution, a reaction solution of the synthesis of urea and liquified ammonia in order to effect transference of ammonia into the absorbing liquid at a temperature of from 20° to 100° C. and at a pressure of from the same pressure as that of the urea synthesis reactor to 50 kg/cm² lower than that to produce
        4. an absorbing liquid containing ammonia and
        5. a gaseous component consisting essentially of hydrogen and nitrogen,
    b. subsequently introducing into a carbon dioxide absorption zone and contacting therein
        1. said absorbing liquid containing ammonia of step (a) (4),
        2. a crude ammonia synthesis gas containing carbon dioxide, and
        3. gaseous ammonia and carbon dioxide recovered from a urea purification process in order to effect transference of substantially all of the carbon dioxide into the absorbing liquid at a temperature of from 130° to 180° C. and at a pressure of from the same pressure as that of the urea synthesis reactor to 50 kg/cm² lower than that to produce
        4. an absorbing liquid containing ammonia and carbon dioxide and
        5. a gaseous component containing hydrogen, nitrogen and a small amount of ammonia,
    c. introducing said absorbing liquid containing ammonia and carbon dioxide of step (b) (4) into a urea synthesis zone to effect the synthesis of urea, and
    d. introducing said gaseous component of step (a) (5) into an ammonia synthsis zone to produce the circulation gas of step (a) (1).

2. A process for the synthesis of urea by reaction of ammonia with carbon dioxide under a pressure of 120–400 kg/cm² and at a temperature of from 160° to 230° C. which comprises:
    a. introducing into an ammonia absorption zone and contacting therein
        1. a circulating gas consisting essentially of ammonia, hydrogen and nitrogen which is the reaction effluent from an ammonia synthesis zone and
        2. a gaseous component containing hydrogen, nitrogen and a small amount of ammonia separated from the carbon dioxide absorption zone of step (b) (4) with
        3. an absorbing liquid selected from the group consisting of water, an aqueous urea solution, an aqueous ammonium carbamate solution, an aqueous ammonia solution, a reaction solution of the synthesis of urea and liquified ammonia in order to effect transference of ammonia into the absorbing liquid at a temperature of from 20° to 100° C. and at a pressure of from the same pressure as that of the urea synthesis reactor to 50 kg/cm² lower than that to produce
        4. an absorbing liquid containing ammonia and
        5. a gaseous component consisting essentially of hydrogen and nitrogen,
    b. subsequently introducing into a carbon dioxide absorption zone and contacting therein
        1. said absorbing liquid containing ammonia of step (a) (4),
        2. a crude ammonia synthesis gas containing carbon dioxide, and
        3. the gaseous component containing hydrogen, nitrogen, ammonia and carbon dioxide recovered from the urea purification process of step (e) (2) in order to effect transference of substantially all of the carbon dioxide into the absorbing liquid at a temperature of from 130° to 180° C. and at a pressure of from the same pressure as that of the urea synthesis reactor to 50 kg/cm² lower than that to produce
        4. an absorbing liquid containing ammonia and carbon dioxide and
        5. a gaseous component containing hydrogen, nitrogen and a small amount of ammonia,
    c. introducing said absorbing liquid containing ammonia and carbon dioxide of step (b) (4) into a urea synthesis zone to effect the synthesis of urea thereby producing a reaction solution of the synthesis of ammonia, and
    d. introducing a portion of said gaseous component of step (a) (5) into an ammonia synthesis zone to produce the circulation gas of step (a) (1), and
    e. stripping said reaction solution of the synthesis of urea of step (c) with the remainder of said gaseous component of step (a) (5) to obtain
        1. an aqueous urea solution, and
        2. a gaseous component containing hydrogen, nitrogen, ammonia and carbon dioxide.

* * * * *